United States Patent [19]

King

[11] 4,136,308
[45] Jan. 23, 1979

[54] STEPPING MOTOR CONTROL
[76] Inventor: Kenyon M. King, 7520 Cerrito Roja, Cucamonga, Calif. 91730
[21] Appl. No.: 828,541
[22] Filed: Aug. 29, 1977
[51] Int. Cl.² ............................................. G05B 19/40
[52] U.S. Cl. .................................... 318/696; 318/138
[58] Field of Search ................ 318/696, 138, 254, 685

[56] References Cited
U.S. PATENT DOCUMENTS
3,304,481  2/1967  Saussele .............................. 318/138

Primary Examiner—Herman J. Hohauser
Attorney, Agent, or Firm—Christie, Parker & Hale

[57] ABSTRACT

A control circuit for operating a stepping motor from a DC power source by switching current successively through four stator windings. Switching time in relation to shaft position is controlled by sensing the back EMF in the stator coils, the sensing circuit including a transformer having a first winding connected in series with two windings and the second winding connected in series with the other two windings of the stator. The voltages across the two windings at the transformer are used to generate a commutation pulse each time the voltages are equal. Each commutation pulse is generated in this manner at predetermined angular positions (phase) of the stepping motor independently of motor speed or supply voltage. The commutation pulses are then used to generate clock pulses for sequencing the switching of the stator windings.

14 Claims, 8 Drawing Figures

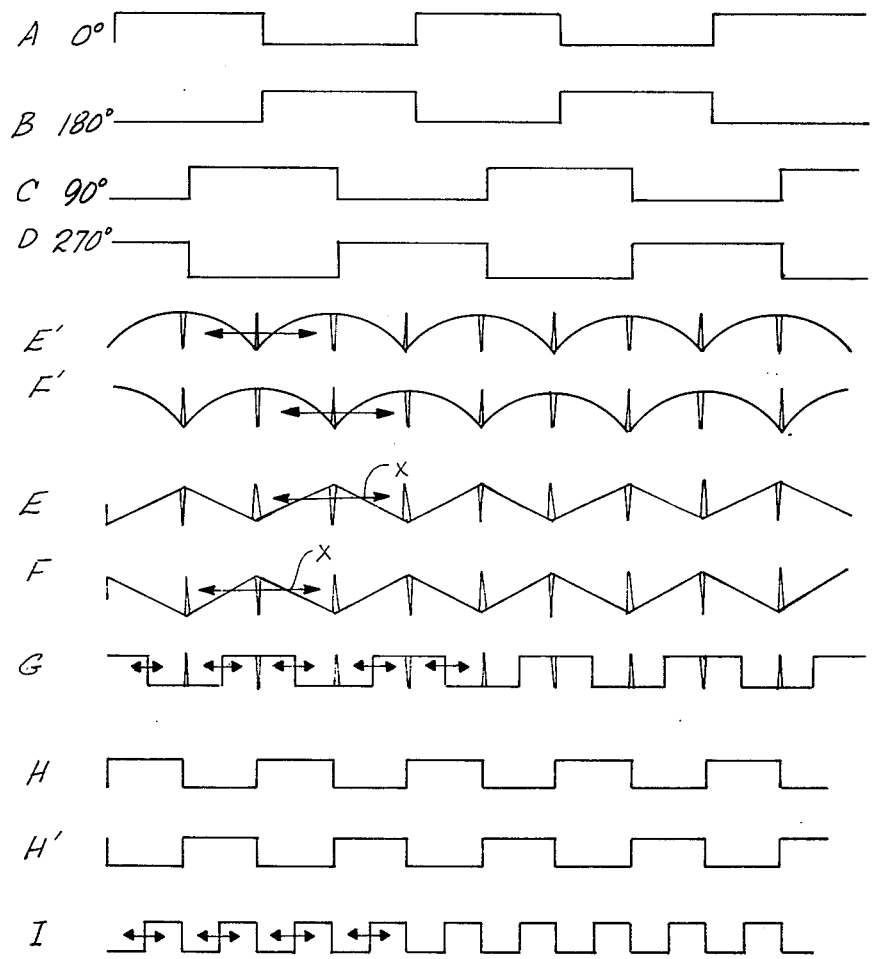
EXT CLOCK, FIXED FREQUENCY
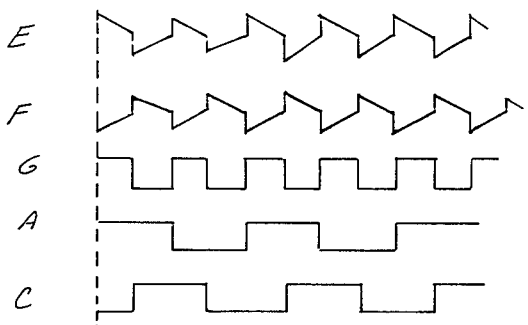
CLOSED LOOP, DC OPERATION

STEPPING MOTOR CONTROL

FIELD OF THE INVENTION

This invention relates to DC motors using electronic commutation, and more particularly, to brushless DC motors utilizing the induced EMF of the motor to control the commutation switching.

BACKGROUND OF THE INVENTION

It is well known that DC motors, which require commutation to operate, are superior to AC or synchronous type motors in terms of torque characteristics, size, weight, and response. However, the commutators and brushes required in DC motors have the disadvantages that the brushes wear out, generate high-frequency noise, and add substantially to the manufacturing cost of the motor. Various circuits have been developed for operating a permanent magnet motor as a brushless DC motor, using an external sensor to sense the position of the rotor. The sensor is used as a commutator to sequentially energize the stator windings. Sensors, such as Hall effect devices and optical encoders, for example, have been used for providing commutation. It has also been recognized that the waveform of the induced or back EMF generated by the rotation of the permanent magnet field relative to the stator windings can be used to indicate the position of the rotor. The use of the back EMF has the advantage that no additional components or sensors are required. There is no alignment problem, which can be a critical problem in obtaining maximum torque and efficiency where a large number of commutation segments are involved. The disadvantage of such systems, however, is that the motor must be rotated before any back EMF signal can be generated. Thus such systems require some type of starting mechanism.

Known systems using back EMF have proved less responsive and lack the reliability of systems using external sensors. Examples of prior art systems of this type are found in U.S. Pat. Nos. 3,304,481 and 3,611,081. A system using resistors in series with the stator windings for generating a voltage in response to the back EMF is described in the publication "Waveform Sensing Closes the Loop in Step Motor Control", by J. R. Frus and B. C. Kuo, Products Engineering, February 1977, pages 47-49. These circuits, however, have not proved entirely satisfactory either because they require some adjustment in the circuit based on the speed to obtain maximum torque, or they are limited to only one winding being energized at a time in the stator.

SUMMARY OF THE INVENTION

The present invention is directed to an improved circuit for commutating an AC or stepper motor without the use of added external sensors. The present invention utilizes the back EMF induced in the stator windings by the permanent magnet rotor to generate a commutation signal which is not affected by motor speed or variations in supply voltage. The commutation signal is accurately keyed to rotor position so that the commutation signals are synchronized to the correct commutation points. That is, they provide an accurate indication of the angular position at which switching must occur to obtain maximum torque regardless of the speed at which the motor is operating. Commutation signals are generated on a single channel simplifying the processing and control of the signal. Series resistors normally used in stepper motor controllers to reduce the time constant of the motor windings are not required. The number of commutation pulses per revolution is limited only by the motor design.

These and other advantages of the present motor control circuit are achieved by providing a rotor position sensor which responds to the back EMF generated in the stator coils of a permanent magnet type stepping motor having four stator windings which are switched in overlapping time sequence across a direct current power source. The sensor includes a transformer having a pair of windings, one of which is connected in series with the power source and two of the stator windings, and the other of which is connected in series with the power source and the remaining two of the stator windings. The voltages across the two windings are compared and used to generate a commutation pulse each time the voltages are equal. It has been determined that if switching of the stator winding occurs at the point in time when the voltage across the two transformer windings are equal, maximum torque is maintained under all load conditions. The commutation pulses by way of the processing circuitry are used to switch the supply voltage across the respective stator windings. The processing circuitry includes means for initiating a starting sequence, a means of limiting the speed of the motor (synchronous operation) and a means of blanking out unwanted interferences.

Phase control circuitry is incorporated to control the phase of the commutation signal to ensure proper phase relationship between the commutation signal and the stator drive voltages in both clockwise and counterclockwise operation. The phase control circuits also control the acceleration and deceleration modes of operation.

DESCRIPTION OF THE DRAWINGS

For a more complete understanding of the invention reference should be made to the accompanying drawings, wherein:

FIGS. 3-8 show a series of waveforms useful in explaining the operation of the circuit of FIG. 1.

DETAILED DESCRIPTION

Figure 1:
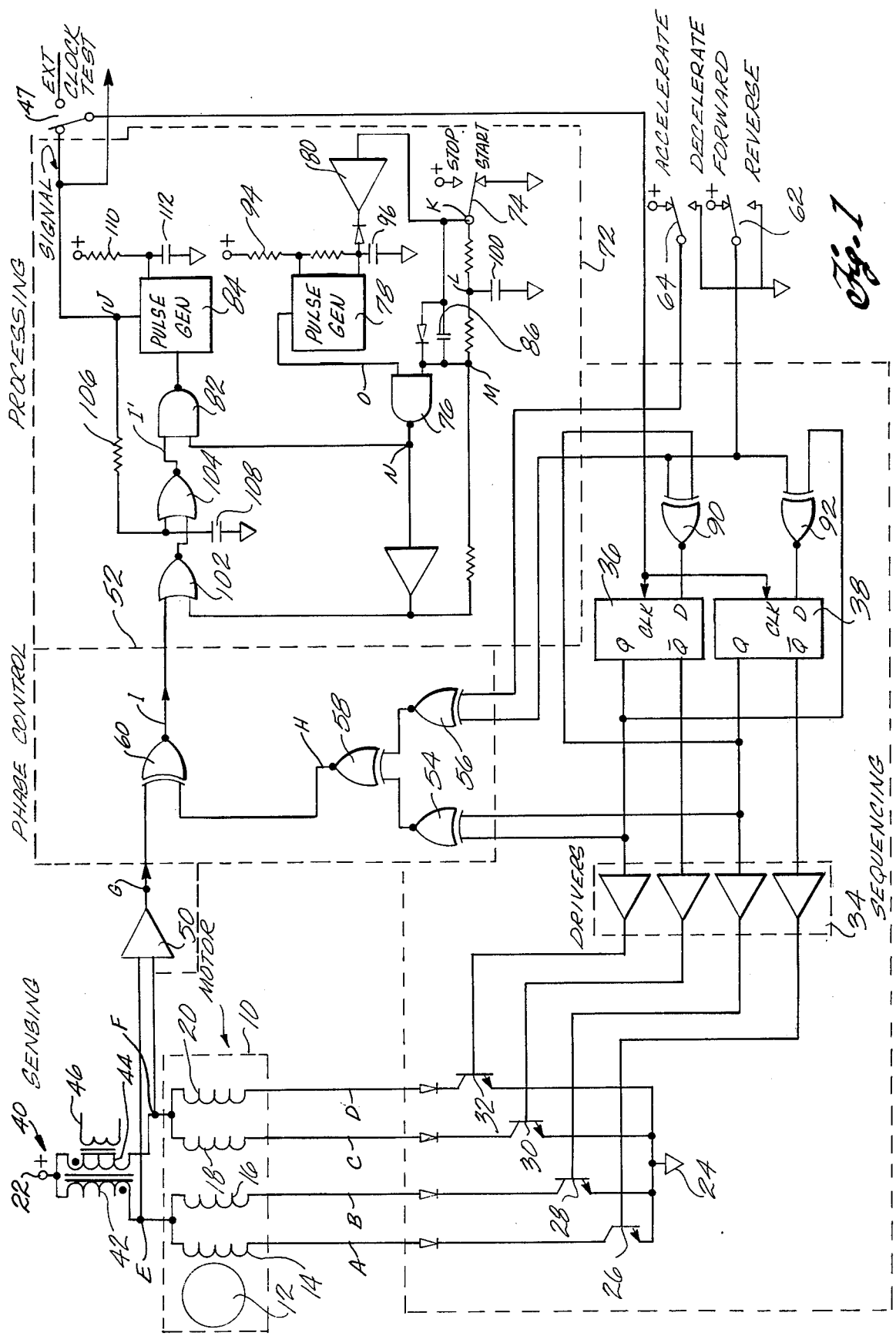
FIG. 1 is a schematic block diagram of the preferred embodiment of the present invention.

Referring to FIG. 1, the numeral 10 indicates generally a stepping motor of the type having a permanent magnet rotor 12 and polyphase stator, preferably four phase windings indicated at 14, 16, 18, and 20. Although a permanent magnet rotor is preferred, the motor may use a variable reluctance rotor as well. While the invention is applicable to synchronous or large stepping angle motors, it is particularly well suited to operation of small angle stepping motors such as described in U.S. Pat. No. 3,519,859. For example, a stepping motor having a 1.8 degree step, requiring the equivalent of 200 commutations per revolution is particularly well adapted to the advantages of the present invention.

The motor 10 is driven from a suitable DC power source (not shown) connected across a positive input terminal 22 and a ground terminal 24. Each of the stator windings is connected across the source through a series of transistor switches, indicated respectively at 26, 28, 30, and 32. These switches are operated in pairs through suitable drivers, indicated generally at 34, by a pair of flip-flops 36 and 38. The switches 26 and 28 are thus controlled by the flip-flop 38 so as to be switched on alternately for substantially equal periods of time under constant speed operation. Similarly the switches 30 and 32 are switched on alternately but at 90° out of phase with the switches 26 and 28. The switching waveforms of the four stator coils are shown in FIGS. 3A–D.

While in conventional drive circuits the stator coils would be connected to the common terminal of the power source, according to the present invention a rotor position sensing circuit 40 comprising a transformer is provided having a first winding 42 connected in series respectively with the stator coils 14 and 16 and one terminal of the power source. The transformer 40 has a second winding 44 which is connected in series between the power source and the respective coil windings 18 and 20. An output signal is derived from the sensing circuit transformer either by a third winding 46 or across the common connections between the respective windings 42 and 44 and the stator coils, as indicated at E and F.

Assuming for the moment that the flip-flops 36 and 38 are triggered from an external clock source by setting of a switch 47, and assuming no mutual coupling between the windings 42 and 44 of the transformer 40, the resulting waveforms at the common connection points is shown in the waveforms of FIGS. 3E′ and 3F′, respectively. Thus the voltages at points E and F are 90° out of phase and represent the detected back EMF signal. With mutual coupling between the windings of the transformer 40, the voltages at points E and F are the resultant of the voltages E′ and F′ and have a waveform substantially as shown in FIGS. 3E and 3F. The amplitudes and frequency of these waveforms, which are 180° out of phase with respect to each other, represent the angular velocity of the rotor. The phase of these signals relative to the stator drive signals represent the angular position of the rotor in relation to the stator. As the load of the motor is varied, for example, the phase of the voltages at E and F will shift in relation to the stator drive signals.

It has been determined that maximum torque is obtained when commutation occurs at the time the voltages at E and F are equal in amplitude. Thus a commutation signal is derived by connecting the points E and F to a comparator circuit 50 which may, for example, be a high gain operational amplifier. Alternatively, the third winding 46 may be used as a signal source for the operational amplifier 50. In either event, the output waveform of the comparator circuit 50 is a rectangular wave substantially with cross-over points occuring at the times the amplitudes of the waveforms of FIGS. 3E and 3F are equal, i.e., when the net flux in the transformer passes through zero. The phase of the rectangular voltage output of the comparator, shown in the waveform of FIG. 3G shifts as the angular position of the rotor changes in relation to the rotor drive signals, as when the load on the motor changes.

The commutation signal (FIG. 3G) derived from the output of the comparator 50 is used to control the switching of the flip-flops 36 and 38 by changing the switch 47 from the external clock source to close an internal timing pulse source hereinafter described. The commutation signal is first applied to a phase control circuit indicated generally at 52, which produces a single polarity timing signal and also insures proper commutation when the motor is reversed or operated in deceleration mode, as hereinafter described. The phase control circuit is a simple logic circuit including four exclusive OR gates, including two input control gates 54 and 56 whose outputs are connected as inputs to a third gate 58, whose output is connected to a fourth exclusive OR gate 60 together with the commutation signal from the comparator 50. The exclusive OR gate 54 compares the two signals from the flip-flops 36 and 38. The output of the exclusive OR gate 54 is a rectangular wave which reverses polarity with the closing of each of the four switches 26, 28, 30 and 32 and having the waveform shown in FIG. 3H or 3H′, depending on motor direction. This signal will be inverted or not by the OR gate 58, depending upon the output of the exclusive OR gate 56, which in turn determines whether the motor is operating in a forward or reverse direction as set by a switch 62, and whether the circuit is operating in an accelerate or decelerate mode as set by a switch 64. Assuming the drive is from an external clock source, the resulting output signal from the exclusive OR gate 60 when operating in the forward/accelerate or reverse/accelerate modes is shown in FIG. 3I. If, in the forward/decelerate or reverse/decelerate modes, the phase is reversed, it will be seen that any phase shift of the signal at the output of the comparator 50 relative to the drive signals shifts the positive going transition of the rectangular signal at the output of the exclusive OR gate 60, as shown in FIG. 3I. The effect, as hereinafter described in detail, is to detect the opposite polarity of the commutation signal without reversing the sequencing of the motor drive circuit. This allows the rotor to lag behind the stator winding drive voltages to maintain maximum braking torque while the rotor and field drive voltages "rotate" in the same direction until the motor stops.

When operating as a commutated or brushless DC motor, the waveforms at E, F and G are modified under constant speed operation, as shown in FIG. 4. The output of the phase control circuit 52 is used to trigger the flip-flops 36 and 38 in place of the external clock by resetting the switch 47. A processing circuit, indicated generally at 72, is provided for generating the flip-flop triggering signal from the commutation signal. A processing circuit provides several functions in that it is used to generate a starting sequence, to blank out unwanted signals, and to control maximum speed (synchronous mode) as well as to generate the clock signals for the flip-flops from the commutation signal.

Because a back EMF signal is not present until the motor is rotating, a starting sequence of pulses is required to initially start rotation of the rotor. While a single starting pulse may in some instances be sufficient, a chain of pulses, at least two in number, is preferable. The starting circuit described is a relatively simple circuit requiring the minimum of components. More elaborate digitally controlled timing and counting circuits can also be employed.

The processing circuit includes a Stop/Start switch 74 which applies a positive level to one input of a NAND gate 76 when the motor is stopped. At the same time, a pulse generator 78 is biased off through an inverter 80. When the switch 74 is actuated to the Start position, it activates the pulse generator 78. The output pulses are passed by the NAND circuit 76 through a NAND circuit 82 to actuate a second pulse generator 84. Also a negative pulse is produced at the input to the NAND gate 76 by grounding the capacitor 86. The output of the NAND circuit 76 in turn causes the second pulse generator 84 to produce an initial output pulse which triggers one or the other of the flip-flops 36 or 38. It will be noted that the flip-flops 36 and 38 are triggered alternately by means of a pair of exclusive OR gates 90 and 92 in response to the setting of the forward-/reverse switch 62 and the states of the respective flip-flops 36 and 38.

Figure 5:
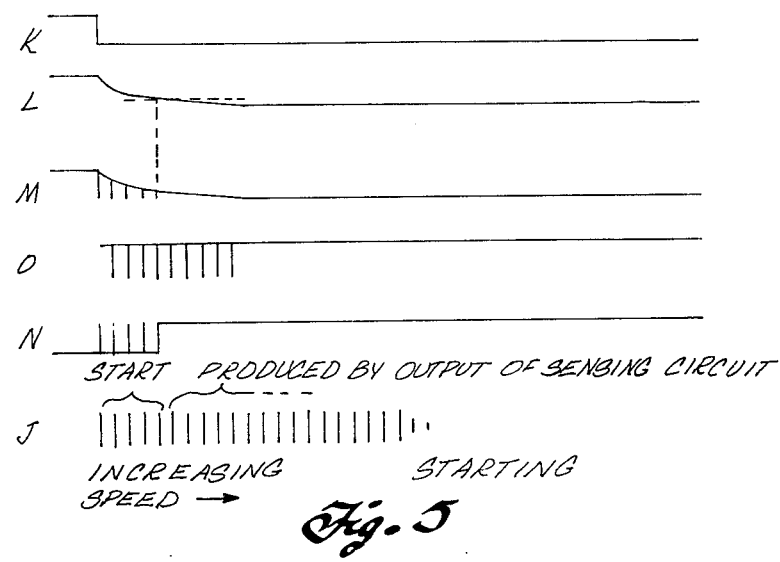
Figure 6:
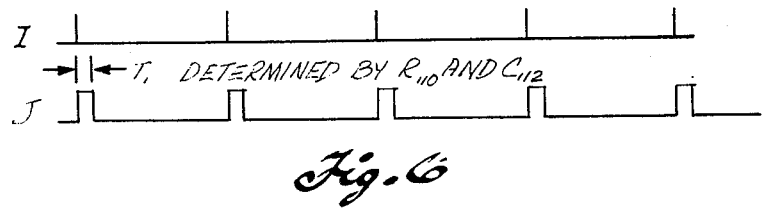

With the pulse generator 78 turned on by the setting of the switch 74, a series of pulses are generated by the pulse generator 78 through the NAND gate 76 and circuit 82 to trigger the pulse generator 84. The pulse generator 78 is controlled in frequency by the time constant of the resistors 94 and capacitor 96. As a capacitor 100 discharges, the voltage at the input to the NAND gate 76 drops below the threshold at which the NAND gate passes pulses from the pulse generator 78. Pulses are now derived directly from the commutation pulse input through a pair of NOR gates 102 and 104 and the NAND circuit 82 for pulsing the pulse generator 84. Output pulses of the generator 84 have a pulse width determined by resistor 110 and capacitor 112. Thus further sequencing of the stator windings is determined by the commutation pulses derived from the transformer 40. The motor will continue to increase in speed until the supply voltage minus the back EMF is balanced by the losses of the motor in the load. The waveforms of the processor circuit during starting are shown in FIG. 5 and in the normal drive mode in FIG. 6.

The NOR gate 104 operates to blank out unwanted transients in the commutation pulse produced by inductance of the motor winding and transformer 40. The NOR gate 104 in response to the R-C network, including resistor 106 and capacitor 108 connected across the output of the pulse generator 84, is adjusted so that if the pulse width of the output pulses of the pulse generator 84 plus the time constant of the resistor 106 and capacitor 108 prevents any commutation signal from triggering the pulse generator 84 before a fixed time interval.

Figure 7:
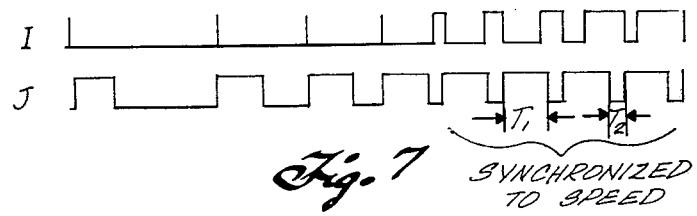
Figure 8:
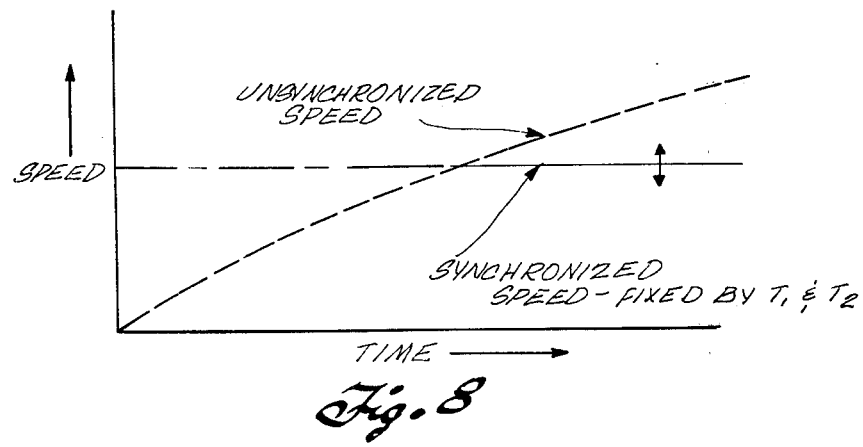

Resistor 106 and capacitor 108 allow sufficient time to elapse after the end of the pulse produced by generator 84 to completely reset the timing circuit of generator 84 before it can be retriggered. Thus, the commutation signal is held until the end of this time period, thereby limiting the maximum frequency of the commutation signal. This mode of operation, called the synchronous mode, limits the maximum frequency of the commutation signal over a wide range of input voltages or load variations, thus synchronising the speed to a set frequency. The waveform for operation in the synchronous mode are shown in FIGS. 7 and 8. As shown by the waveform of FIG. 7, the waveform at I is modified, as shown in FIG. 7I' so that the commutation signal is held by the pulse generator 84 while the time $T_2$ is determined by the time constant of resistor 106 and capacitor 108.

Figure 2:
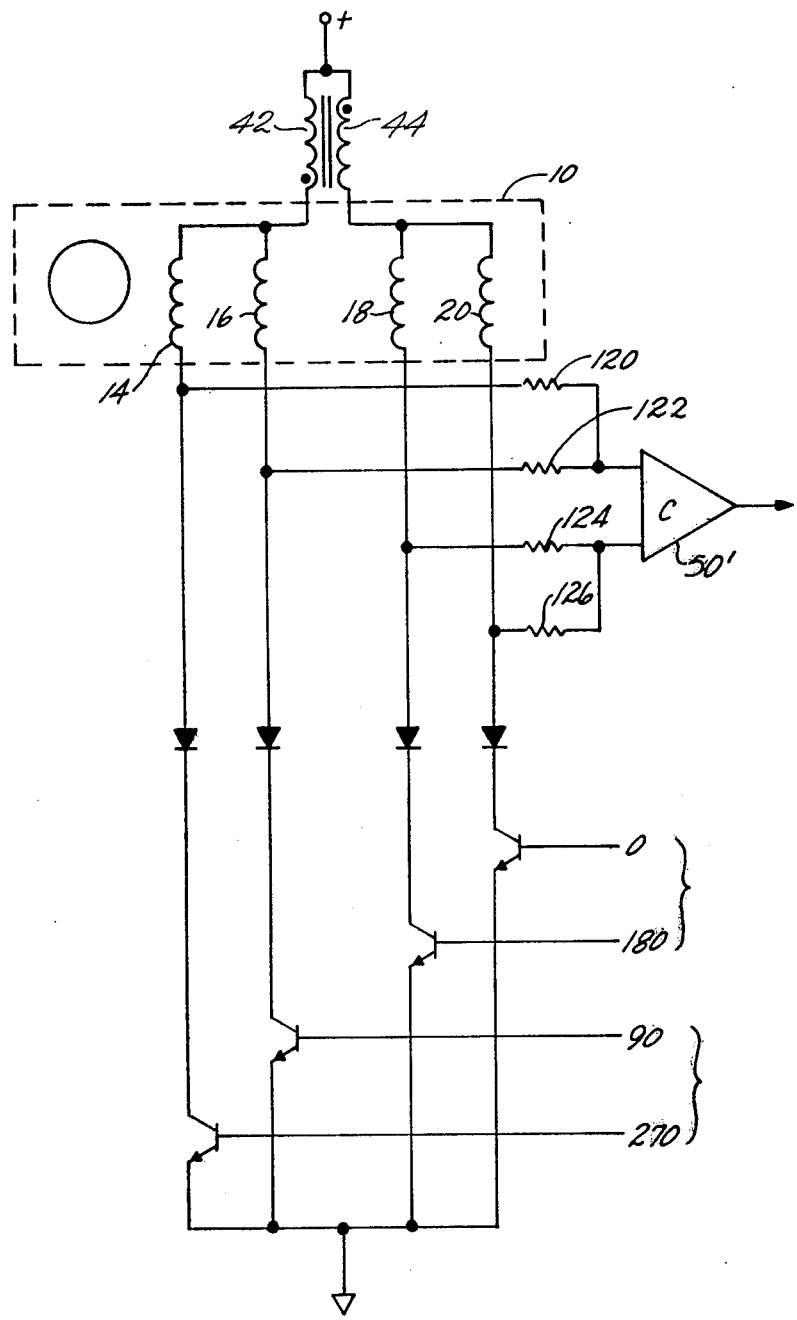
FIG. 2 shows alternate way of generating the commutation signal.

FIG. 2 shows an alternate sensing circuit in which two inputs to a comparator 50' are connected to the centertaps of series resistors 120–122 and 124–126 connected respectively across the two pairs of stator windings 1 and 16, 18 and 20. This circuit arrangement produces output voltage of larger magnitude but is otherwise comparable in operation.

What is claimed is:

1. A commutation circuit for a brushless DC motor of a type having a permanent magnet rotor and four stator windings energized by switching the windings in sequence across a DC power source, the commutation circuit comprising a transformer having a first winding connected in series with two of the stator windings and the power source and having a second winding connected in series with the other two stator windings and the power source, means comparing the voltages across the two windings for generating an output pulse when the two voltages are equal, and means for switching the stator windings in response to the output pulses of said comparing means.

2. Apparatus of claim 1 further including reversing means for reversing the switching sequence of the stator windings to reverse the direction of rotation of the rotor.

3. Apparatus of claim 1 wherein said comparing means generates a signal having a substantially rectangular waveform with the crossover points corresponding in time to the times the voltages across the two windings of the transformer are equal, and means responsive to the phase of the rectangular wave for generating pulses for controlling the phase of said switching means.

4. Apparatus of claim 3 further including phase shifting means coupled to the output of said comparing means for shifting the phase relative to the switching means to reverse the torque of the motor to produce a braking action.

5. Apparatus of claim 4 wherein said phase shifting means includes signal means indicating whether the motor is in an accelerate or decelerate mode, means responsive to the phase of the switching means and the signal means for detecting one polarity or the other of the output of the comparing means for shifting the phase of the switching means without changing the direction of rotation of the motor.

6. Apparatus of claim 1 including starting means for generating two or more starting pulses for triggering the switching means when the rotor is stationary.

7. A drive circuit for operating from a DC power source a motor having four stator coils and a rotor, comprising a transformer having first and second windings, the first winding being connected respectively in series with two of said stator coils and the second winding being connected in series with the other two of said stator coils, first switching means for alternately connecting each of the stator windings in series with one of the windings across the DC power source, second switching means for alternately connecting each of the stator windings in series with the other one of the transformer windings across the DC source, means responsive to the instantaneous difference in voltage across the two transformer windings for generating an output pulse each time said voltage difference is zero, and means responsive to the output pulses for alternately activating said first and second switching means.

8. Apparatus of claim 7 further including time delay means for limiting frequency of said output pulses for controlling the maximum rotational velocity of the motor.

9. Apparatus of claim 8 wherein said time delay means includes means fixing the time duration of said output pulses, and means delaying the start of the next output pulse to a predetermined minimum time following the termination of the previous output pulse.

10. A control circuit for operating a rotor type motor having four stator windings from a DC power source, comprising switching means for connecting one end of each of these stator windings to one terminal of the power source, means including a transformer having two windings connecting the other ends of the stator windings in pairs to the other end of the DC source, means operating said switching means to energize the stator windings in sequence from the power source, and means responsive to the difference in voltage across the two windings of the transformer for switching of the stator windings at the time the voltages across the two transformer windings are substantially equal.

11. A commutation circuit for a brushless DC motor having a rotor and a plurality of stator windings energized by switching the stator windings in sequence across a DC power source, the commutation circuit comprising a transformer having windings connected in series with the stator windings, means for detecting when the net flux linking the windings of the transformer goes through a zero crossover point, and means synchronizing the switching of the stator windings with timing of the zero crossover points in response to the detecting means.

12. Apparatus of claim 11 wherein said detecting means includes means generating an output signal having a substantially rectangular waveform in which the zero crossover points of the waveform correspond to the zero crossover points of the net flux in the transformer.

13. Apparatus of claim 12 further including means for shifting the phase of the rectangular waveform signal and changing switching time of the stator windings to produce a braking torque.

14. Apparatus of claim 12 further including means for reversing the phase of the rectangular waveform signal relative to the switching sequence to reverse the direction of the motor.

* * * * *